(12) United States Patent
Steuer et al.

(10) Patent No.: US 10,875,941 B2
(45) Date of Patent: Dec. 29, 2020

(54) POLYVINYL ACETAL WITH REDUCED FLOWABILITY

(71) Applicant: KURARAY EUROPE GMBH, Hattersheim (DE)

(72) Inventors: Martin Steuer, Liederbach (DE); Daniel Wenzlik, Wiesbaden (DE); Takeshi Kusudo, Troisdorf (DE); Uwe Keller, Avon (FR)

(73) Assignee: KURARAY EUROPE GMBH, Hattersheim (DE)

( * ) Notice: Subject to any disclaimer, the term of this patent is extended or adjusted under 35 U.S.C. 154(b) by 0 days.

(21) Appl. No.: 16/092,069

(22) PCT Filed: Apr. 5, 2017

(86) PCT No.: PCT/EP2017/058165
§ 371 (c)(1),
(2) Date: Oct. 8, 2018

(87) PCT Pub. No.: WO2017/174684
PCT Pub. Date: Oct. 12, 2017

(65) Prior Publication Data
US 2019/0112397 A1  Apr. 18, 2019

(30) Foreign Application Priority Data
Apr. 8, 2016 (EP) .................................. 16164401

(51) Int. Cl.
| | | |
|---|---|---|
| *C08F 16/38* | (2006.01) | |
| *C08F 8/28* | (2006.01) | |
| *C08J 5/18* | (2006.01) | |
| *C08K 5/11* | (2006.01) | |
| *C08K 5/12* | (2006.01) | |

(52) U.S. Cl.
CPC ............... *C08F 16/38* (2013.01); *C08F 8/28* (2013.01); *C08J 5/18* (2013.01); *C08K 5/11* (2013.01); *C08K 5/12* (2013.01); *C08J 2329/14* (2013.01)

(58) Field of Classification Search
None
See application file for complete search history.

(56) References Cited

U.S. PATENT DOCUMENTS

| | | |
|---|---|---|
| 4,287,107 A | 9/1981 | Hermann et al. |
| 4,626,072 A | 12/1986 | Clerc et al. |
| 4,751,266 A | 6/1988 | Hermann et al. |
| 4,970,245 A | 11/1990 | Futami et al. |
| 5,559,175 A | 9/1996 | Kroggel et al. |
| 6,801,652 B1 | 10/2004 | Stanzl et al. |
| 7,842,395 B2 | 11/2010 | Lu et al. |
| 8,053,504 B1 | 11/2011 | Rymer et al. |
| 2005/0256258 A1 | 11/2005 | Keller |
| 2006/0263608 A1 | 11/2006 | Choi et al. |
| 2007/0009714 A1 | 1/2007 | Lee et al. |
| 2011/0155205 A1 | 6/2011 | Steuer et al. |
| 2013/0074910 A1 | 3/2013 | Isoue et al. |
| 2013/0273378 A1 | 10/2013 | Iwamoto et al. |
| 2017/0043557 A1* | 2/2017 | Kobayashi ............ C08F 216/38 |

FOREIGN PATENT DOCUMENTS

| | | |
|---|---|---|
| EP | 0 123 568 B1 | 5/1987 |
| EP | 0185863 B1 | 5/1989 |
| EP | 1 118 258 B1 | 7/2001 |
| EP | 2 660 216 A1 | 6/2013 |
| GB | 2 007 677 A | 5/1979 |
| JP | H02123103 A | 5/1990 |
| JP | H051109 A | 1/1993 |

* cited by examiner

Primary Examiner — Robert T Butcher
(74) Attorney, Agent, or Firm — Brooks Kushman P.C.

(57) ABSTRACT

Polyvinyl acetals with a degree of acetalization of 70-84 mol %, and characterized by a molar ratio of the amount of continuous syndiotactic sequences of vinyl alcohol groups with 3 members of at least 0.152, based on the total amount of vinyl alcohol groups in the polyvinyl acetal, have exceptionally low melt flow.

17 Claims, 4 Drawing Sheets

POLYVINYL ACETAL WITH REDUCED FLOWABILITY

CROSS REFERENCE TO RELATED APPLICATIONS

This application is the U.S. National Phase of PCT Appln. No. PCT/EP2017/058165 filed Apr. 5, 2017, which claims priority to European Application No. 16164401.8 filed Apr. 8, 2016, the disclosures of which are incorporated in their entirety by reference herein.

BACKGROUND OF THE INVENTION

1. Field of the Invention

The invention relates to polyvinyl acetals with reduced flowability, a process for their preparation and their use in plasticized and non-plasticized films.

2. Description of the Related Art

Plasticized polyvinyl butyral has long been known as an intermediate layer for laminated safety glasses for architectural and automobile application as well as an adhesive film for photovoltaic modules.

In order to adjust the physical properties of polyvinyl acetals to the requirements of different applications, the molecular structure of its polymer chain was studied with regard to composition (degree of acetalisation, residual acetate content and residual alcohol content), chain length, aldehyde used and compatibility with different plasticizers.

It was furthermore studied to adjust the physical properties of polyvinyl acetals in view of the sequence of the repeating units of the polymer chain, i.e. acetal unit, acetate units and especially vinyl alcohol units.

For example, GB 2007677 discloses a process for the manufacture of polyvinyl acetals in which the sequence of repeating units in the polyvinyl acetal chain is "frozen" as not being in thermodynamic equilibrium. For this purpose, emulsifiers are used in the acetalisation reaction, which affects the sequence of groups in the polymer chain.

The use of emulsifiers to affect the polymer chain is furthermore disclosed in U.S. Pat. Nos. 8,053,504 and 4,970,245. In the process according to U.S. Pat. No. 4,970,245, a low acetalisation temperature is utilized to prevent the sequence of repeating units in the polyvinyl acetal from being in thermodynamic equilibrium.

On the contrary U.S. Pat. No. 8,053,504 describes only acetalisation temperatures of at least 80° C. to control the polymer sequence. The sequence of repeating units of a polyvinyl acetals produced under such conditions (i.e. high reaction temperatures) are in thermodynamic equilibrium.

JP 3036894 discloses a process for production of polyvinyl butyral having a degree of acetalisation of 65-75 mol %, which comprises a two-step addition of acid catalyst and a reaction temperature of at least 69° C. The resulting polyvinyl butyral is characterized by the amount of heterotactic, syndiotactic and isotactic triades of hydroxyl groups. The polyvinyl acetal disclosed in JP 3036894 has an enhanced flowability, which is attributed to the amount of hydroxyl groups grouped in 3, 4 and 5 membered chains and the stereochemistry of the 3-membered chains. JP 3036894 discloses a polyvinyl acetal having a molar ratio of syndiotactic sequences of vinyl alcohol groups with 3 members of 0.3-2 mol %; the resulting secondary structure of the polyvinyl acetal is the reason for the enhanced flowability of the polyvinyl acetal.

In another example for enhancing flowability of polyvinyl acetal and plasticized films thereof, US20110155205A1 discloses polyvinyl acetal with high flowability and plasticizer-containing films made thereof. High flowability results in a viscosity (<75 mPas) of the polyvinyl acetal and high melt flow rate MFR of the plasticized polyvinyl acetal (i.e. the film) with MFR(100) of more than 500 mg/10 min. Such plasticized polyvinyl acetals or films have a reduced mechanical stability and are difficult to coextrude with plasticized polyvinyl acetal mixtures having different mechanical stability (i.e. melt flow rates MFR). Without being bound to this theory, a reason for the high flowability of polymers described in US20110155205A is the low concentration of acidic catalyst utilized in the acetalization process.

The prior art discussed above is concerned with enhancing the flowability of polyvinyl acetals, i.e. to achieve higher flowability. While this is beneficial for certain applications, reducing flowability is desired in other circumstances. For example, reduced flowability would result in plasticized films made from such material with more rigid behaviour and/or improved mechanical stability.

The object of the present invention was therefore to provide polyvinyl acetals with reduced flowability for producing plasticizer-containing films.

U.S. Pat. Nos. 4,751,266 and 5,559,175 disclose polyvinyl acetals and plasticized films produced thereof, but are silent on the secondary structure of the polyvinyl acetal and the resulting mechanical properties as expressed by for example viscosity of melt flow rates MFR.

SUMMARY OF THE INVENTION

It was found that the rheological properties of polyvinyl acetal or plasticized films produced therefrom can be adjusted by manipulating the secondary structure of the polymer chain. This can be examined in a simple manner by $^{13}$C-NMR measurements. The present invention therefore relates to polyvinyl acetal with a degree of acetalisation of 70-84 mol %, characterised by a molar ratio of the amount of continuous syndiotactic sequences of vinyl alcohol groups with 3 members of at least 0.152, based on the total amount of vinyl alcohol groups in the polyvinyl acetal.

The invention further relates to a process for preparing a polyvinyl acetal by acid-catalysed reaction of at least one polyvinyl alcohol with at least one aldehyde, characterised by the following process steps:

a) reacting the polyvinyl alcohol with the aldehyde at a temperature of 0 to 30° C. by addition of an acid catalyst, whereas the ratio of acid catalyst to polyvinyl alcohol is at least 7.5 mol H+ per kg of polyvinyl alcohol, b) completing the reaction by heating the reaction mixture of a) after complete dosage of the acid catalyst to 69 to 80° C. and keeping the reaction mixture in this temperature range for at least 180 min, c) cooling the reaction mixture of b) to 15 to 45° C. and separating the polyvinyl acetal, d) and neutralising the polyvinyl acetal separated from the reaction mixture.

DETAILED DESCRIPTION OF THE PREFERRED EMBODIMENTS

Figure 1:
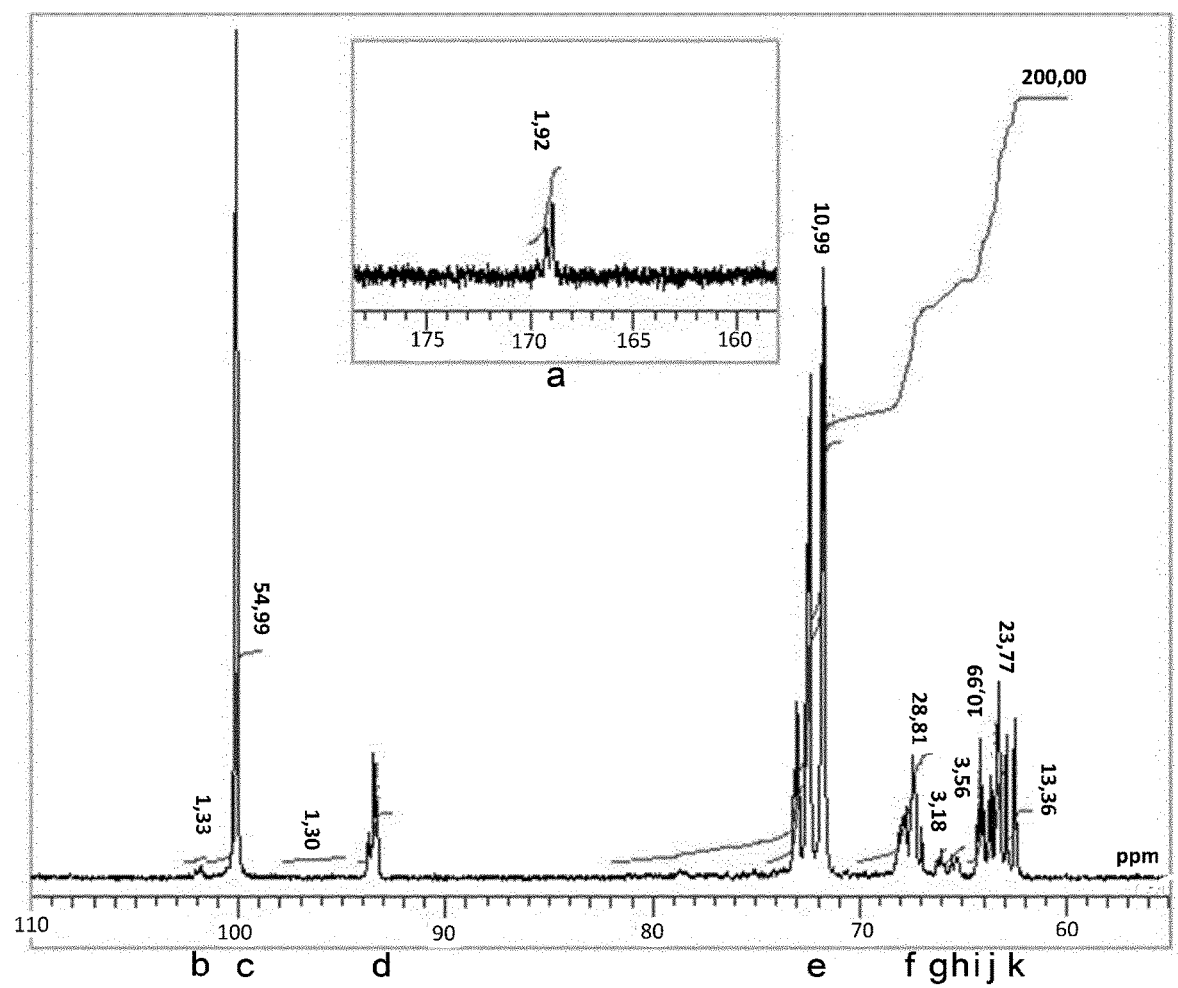
FIGS. 1-4 depict $^{13}$C NMR spectra of polyvinyl acetals with peak identification and integration limits as set forth in Table 1.

The flow behaviour of polyvinyl acetal is highly dependent on the formation of vinyl alcohol domains and the stereochemistry of the hydroxyl groups within these domains.

Accordingly, the polyvinyl acetal according to the invention may have a molar ratio of syndiotactic sequence of vinyl alcohol groups with 3 members of at least 0.150 based on whole of vinyl alcohol groups in the polyvinyl acetal, preferably at least 0.17, more preferably at least 0.18, in each case with an upper limit of 0.25.

In a first embodiment, the polyvinyl acetal according to the invention has a content of continuous syndiotactic sequence of vinyl alcohol groups with 3 members of at least 4.5 mol %, preferably at least 5.0 mol %, more preferably at least 5.2 mol %, in each case with an upper limit of 6 mol % based on whole of groups consisting of vinyl alcohol group, vinyl acetal group and vinyl acetate group in the polyvinyl acetal.

In a second embodiment, the polyvinyl acetal according to invention may have a molar ratio of the amount of continuous sequences of vinyl alcohol groups with 5 members with a sterochemical sequence of mrrm (meso/racemo/racemo/meso) of less than 0.3, preferably less than 0.29 and at least 0.20 based on the total amount of continuous syndiotactic sequences of vinyl alcohol groups with 3 members in the polyvinyl acetal. This amount of continuous sequences of vinyl alcohol groups with 5 members with a sterochemical sequence of mrrm (meso/racemo/racemo/meso) is especially reached when the polyvinyl acetal has a degree of acetalization between 70 and 75 Mol %.

The polyvinyl acetal of the invention may further be characterised by the stereochemistry of continuous syndiotactic sequences of vinyl alcohol groups with 5 members. The stereochemistry of such groups is shown in the following formulas 1-3:

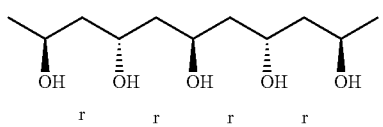
(1)

Continuous syndiotactic sequences of vinyl alcohol groups with 5 members according to formula (1) are referred to as "rrrr" groups.

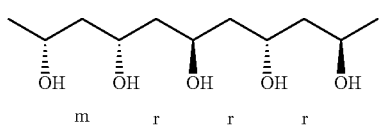
(2)

Continuous syndiotactic sequences of vinyl alcohol groups with 5 members according to formula (2) are referred to as "mrrr" groups.

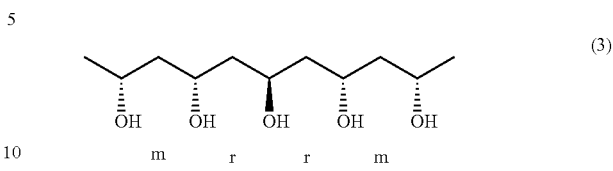
(3)

Continuous syndiotactic sequences of vinyl alcohol groups with 5 members according to formula (3) are referred to as "mrrm" groups.

In a third embodiment, the polyvinyl acetal according to invention may have a molar ratio of the amount of continuous sequences of vinyl alcohol groups with 5 members with a sterochemical sequence of rrrr (racemo/racemo/racemo/racemo) of more than 0.23 with an upper limit of 0.33 based on the total amount of continuous syndiotactic sequences of vinyl alcohol groups with 3 members in the polyvinyl acetal.

In a fourth embodiment of the invention, the polyvinyl is to further characterized in an OH blockiness of the polyvinyl acetal, defined as a quotient VV/(VB+BB) of more than 0.35, wherein with VV stands for the amount of methylene groups of two adjacent alcohol sequences, VB for the amount of methylene groups adjacent to an alcohol and an acetal sequences and BB for the amount of methylene groups of two adjacent acetal sequences.

The methylene groups VV, VB and BB considered within the scope of this invention are shown in the following formula of a polyvinyl butyral chain:

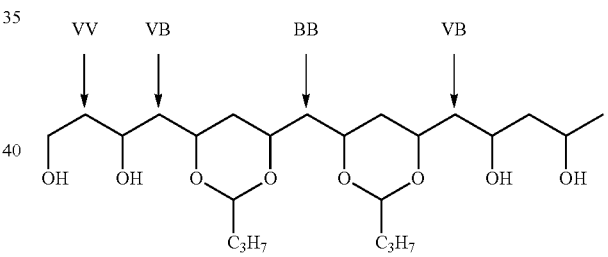

The OH blockiness of the polyvinyl acetals according to the invention is calculated from the quotient VV/(VB+BB) and can be determined by $^{13}$C-NMR measurements, as disclosed hereinafter. The OH blockiness of polyvinyl acetal as defined above by the quotient VV/(VB+BB) is preferably greater than 0.37, and in particular greater than 0.39, in each case with an upper limit for OH blockiness of 0.45.

The polyvinyl acetal of this invention has preferably a degree of acetalization of 75-84 mol %, more preferably of 80-84 mol %.

Polyvinyl acetals according to the invention preferably have a residual acetate content of 0.1-8 mol %, more preferably 0.2 to 5.0 and in particular 0.2 to 2.0 mol %. In a preferred variant of the invention, the residual acetate content is between 0.15 and 1.2 mol %.

The residual acetate content of the polyvinyl acetals according to the invention may be identical to that of the polyvinyl alcohols used. In another embodiment of this invention, the residual acetate content is reduced by post-saponification.

Polyvinyl alcohols used according to this invention may have viscosity-average degrees of polymerization (DP)

between 500 and 2500, preferably between 1500 and 2500, more preferably between 1600 and 2000. Single polyvinyl alcohols or mixtures of at least two different polyvinyl alcohols may be used. Accordingly, polyvinyl acetals according to the invention have a viscosity-average degree of polymerization (DP) of less than 2500, preferably between 500 and 2500, more preferably between 1500 and 2500, and most preferably between 1600 and 2000.

The flowability of polyvinyl acetal according to the invention can additionally also be expressed via its solution viscosity in a 5% by weight solution in a mixture of 95 parts ethanol and 5 parts water at 20° C. This is preferably more than 90 mPas, more preferably more than 100 mPas, and most preferably more than 110 mPas.

The mechanical properties of polyvinyl acetals according to the invention can additionally be expressed via the melt flow rate at 100° C. (MFR 100). Mixtures comprising 30-40 wght % of a plasticizer with the polyvinyl acetal preferably have preferable a melt flow rate at 100° C. (MFR 100) of less than 100 mg/10 min, more preferably less than 75 mg/10 min and most preferably less than 50 mg/10 min. The melt flow rate at 100° C. (MFR 100) should be higher than 2 mg/10 min.

The polyvinyl acetals produced by the method of the invention have all chemical, physical and mechanical features as already disclosed.

When preparing polyvinyl acetals at least one polyvinyl alcohol is usually first dissolved in water under elevated temperature (70-99° C.) and then acetalized at a temperature of 0 to 30° C. in presence of an acid catalyst like HCl, $HNO_3$ or $H_2SO_4$ with one or more aldehydes with 2 to 10 carbon atoms. Suitable in this process are for example acetaldehyde, iso-butyraldehyde and n-butyraldehyde.

The process according to the invention is preferably carried out in the absence of emulsifiers or surfactants, for example sulphonic acid salts such as the sodium salt of dodecyl sulphonic acid, which is used frequently in the prior art.

The polyvinyl acetal produced precipitates either during or after the addition of the acid catalyst i.e. in step a) of the process of the invention. The acid or aldehyde can be added in process step a) at different dosing times and/or with a dosing pause. Preferably, in the process of the invention, the polyvinyl acetal precipitates during step a) and at least 5% of the acid catalyst is added before beginning of the precipitation of the polyvinyl acetal.

The process according to the invention is therefore preferably carried out at a temperature in process step b) of at least 68° C., particularly of more than 72° C., in each case with an upper limit of 80° C. Preferably, the temperature in process step a) is maintained over a period of at least 20 min.

Independent of process step a), the temperature in process step b) may be kept over a period of at least 180 min, preferably more than 210 min, in each case with an upper limit for the holding time of 600 min.

Acetalisation of polyvinyl alcohols is an acid-catalysed reaction, acetal groups being formed as a function of temperature and then breaking down again. The process according to the invention is therefore preferably carried out at a ratio of acid to polyvinyl alcohol of at least 7.5 mol H+ per kg of polyvinyl alcohol, preferably more than 8 mol H+ per kg, and most preferably more than 9 mol H+ per kg of polyvinyl alcohol.

As a result of cooling the reaction mixture in step c), the sequence of repeating units in the polyvinyl acetal set in step b) is frozen and is no longer changed by the additional removal of the acid catalyst. The thermodynamic equilibrium of the sequence of repeating units in the polyvinyl acetal obtained in step b) is thus fixed.

In step d) of the process according to the invention the polyvinyl acetal separated from the reaction mixture is neutralised. This may be achieved by by adding bases, such as KOH, NaOH, $Mg(OH)_2$ or $NaHCO_3$ and/or by washing with water.

In another preferred version of the claimed process, the residual acetate content of the polyvinyl acetals is adjusted by addition of a stoichiometric amount of a strong base to the solution of the polyvinyl alcohol at a temperature between 60 it and 99° C. before addition of acid and aldehyde. The strong base effects the saponification of a portion of the original acetate groups of the polyvinyl alcohol, yielding lower amount of acetate groups in the polyvinyl acetal.

The polyvinyl acetals according to the invention can be processed particularly effectively with conventional plasticizers to form plasticizer-containing films. Films of this type are suitable for use in laminate glasses for the automobile and construction industries as well as for the production of photovoltaic modules.

In another embodiment of the invention, the plasticised films produced with the polyvinyl acetals according to the invention may have a wedged-shaped profile for producing laminated glazing for providing head-up display functionality.

The films produced with the polyvinyl acetals according to the invention preferably have a plasticizer content in the range from 0-42% by weight, preferably 18 to 38% by weight, more preferably from 22 to 30% by weight (in each case based on the total formulation).

Plasticized films may contain one or more plasticizers that are common in this technical field and are known to one skilled in the art. One or more plasticizers are particularly preferable, selected from the group of di-2-ethylhexyl sebacate, 1,2 cyclohexane dicarboxylic acid diisononyl ester, di-2-ethylhexyl adipate, di-2-ethylhexyl phthalate, dioctyl adipate, dihexyl adipate, dibutyl sebacate, di-2-butoxyethyl sebacate, triethyleneglycol-bis-2-ethylhexanoate, triethyleneglycol-bis-n-heptanoate, triethyleneglycol-bis-n-hexanoate, tetraethylene-glycol-bis-n-heptanoate, di-2-butoxyethyl adipate, di-2-butoxyethoxyethyl adipate.

In another embodiment, the polyvinyl acetals of the invention can be shaped (preferable extruded) into films without plasticizer or with a low amount of plasticizer like 0 to 10 wt. %.

Films produced with the polyvinyl acetals according to the invention may also contain adhesion regulators, such as the alkaline and/or alkaline earth salts of organic acids disclosed in WO 03/033583 A1. Potassium acetate and/or magnesium acetate have proven to be particularly suitable. The alkaline and/or alkaline earth metal salts can be used alone or in combination in an amount from 0 to 300 ppm, preferably 0 to 100 ppm.

The production of films based on plasticizer-containing polyvinyl acetals is known industrially and is described, for example, in EP 185863 B1 or EP 1118258 B1. The processing of these films is also known to those skilled in the art and can be carried out in 'autoclave processes' at an increased pressure of 10 to 15 bar and at temperatures of 130 to 145° C. Alternatively, processing may be carried out in "vacuum bag laminators", "vacuum ring laminators" or "vacuum laminators", for example in accordance with EP 123568 B1 at approx. 200 mbar and 130 to 145° C.

Measuring Procedures:

The flow behaviour of the film is determined as the melt index (melt flow rate MFR) in accordance with ISO 1133 using a corresponding apparatus, for example from Göttfert, model MI2. The MFR value is given at the corresponding temperatures with a 2 mm nozzle with weight loading of 21.6 kg, in grams or milligrams every 10 minutes (g/10 min or mg/10 min)

The polyvinyl alcohol and polyvinyl alcohol acetate contents of the polyvinyl acetals were determined in accordance with ASTM D 1396-92. The degree of acetalisation (=butyral content) can be calculated as the remaining portion from the sum of polyvinyl alcohol and polyvinyl acetate content established in accordance with ASTM D 1396-92 needed to make one hundred. Conversion from % by weight into mol % is achieved in accordance with formulae known to those skilled in the art.

The metal ion content was determined by atomic absorption spectroscopy (AAS).

The solution viscosity of the polyvinyl acetals was measured in accordance with DIN 53015 at 20° C. in a mixture of 95 parts ethanol and 5 parts water. The solid content of the viscosity solution was 5% by weight.

The solution viscosity of the polyvinyl alcohols was measured in accordance with DIN 53015 at 20° C. in water. The solid content of the viscosity solution was 4% by weight.

The acetyl content (AC) of polyvinyl alcohol was calculated from the result of the degree of hydrolysis (DH) of polyvinyl alcohol, which is determined according to the method described in JIS-K6726, according to following formula:

$$AC \text{ (mole \%)} = 100 - DH \text{ (mole \%)}$$

DP (viscosity-average degree of polymerization) of polyvinyl alcohol was determined according to JIS-K6726. Concretely, the polyvinyl alcohol is re-hydrolyzed to a degree of hydrolysis of at least 99.5 mol %, and purified, and its intrinsic viscosity $[\eta]$) is measured in water at 30° C., and from it, the viscosity-average degree of polymerization (DP) of the polyvinyl alcohol is obtained according to the following formula:

$$P = ([\eta] \times 10000/8.29)^{(1/0.62)}$$

Figure 2:
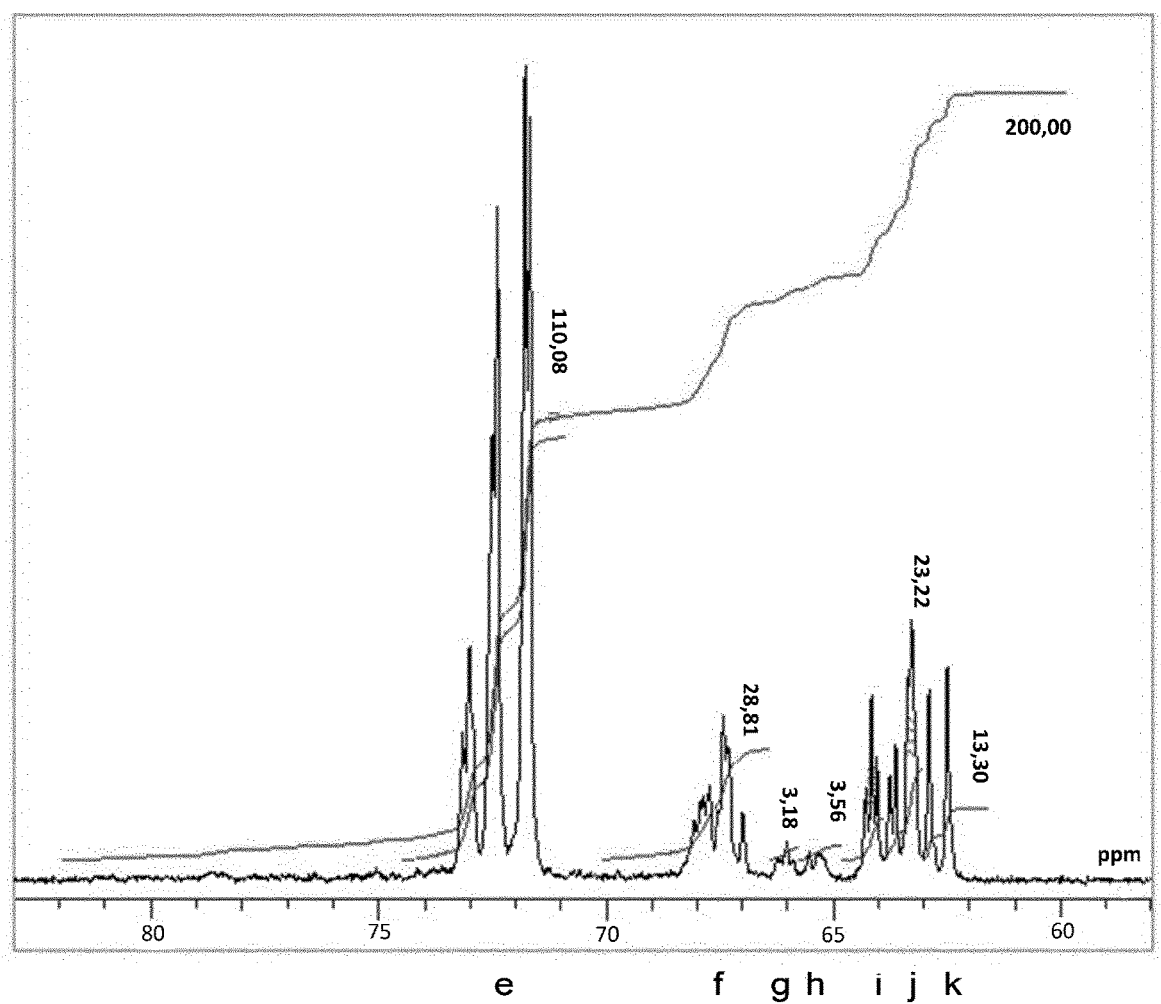
Figure 3:
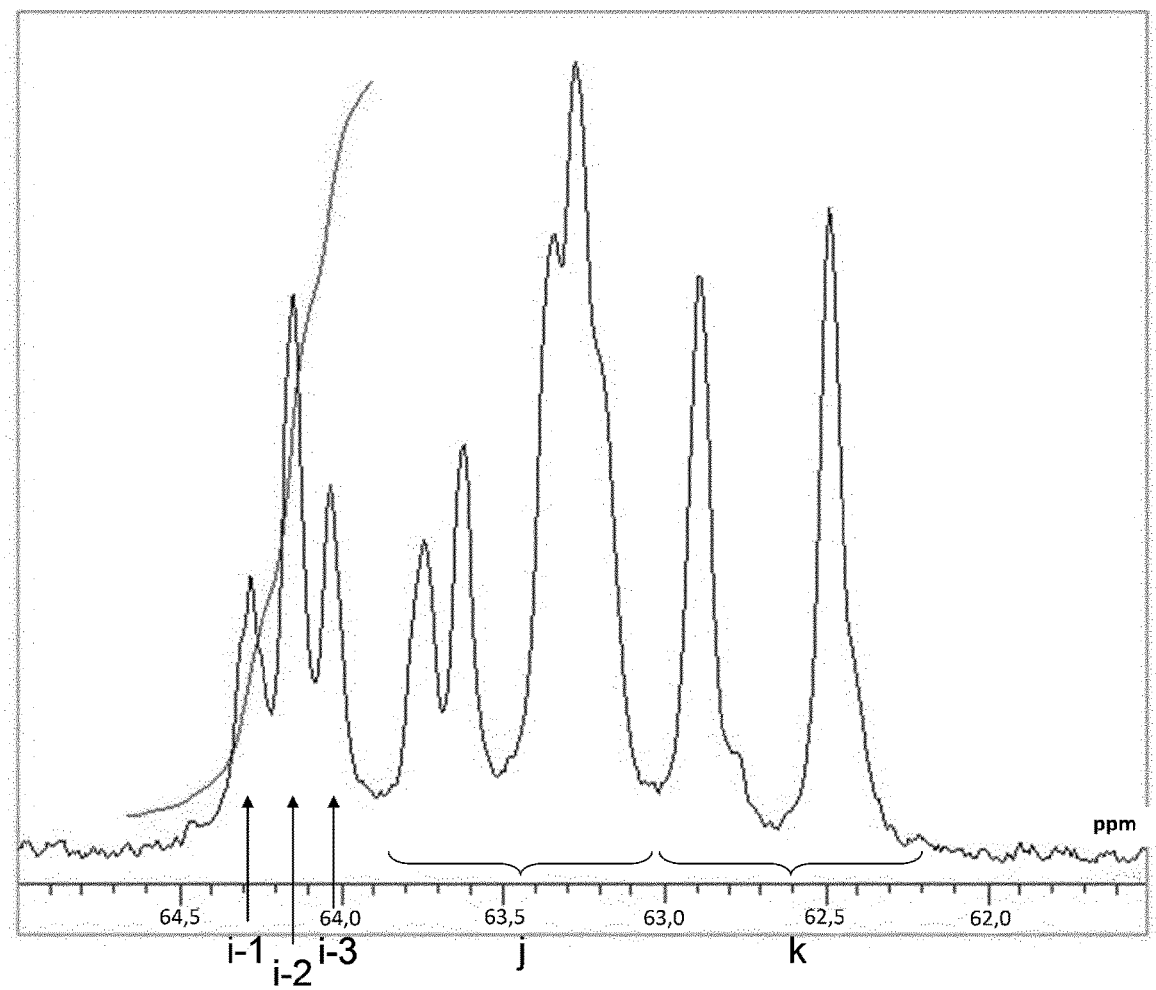
Figure 4:
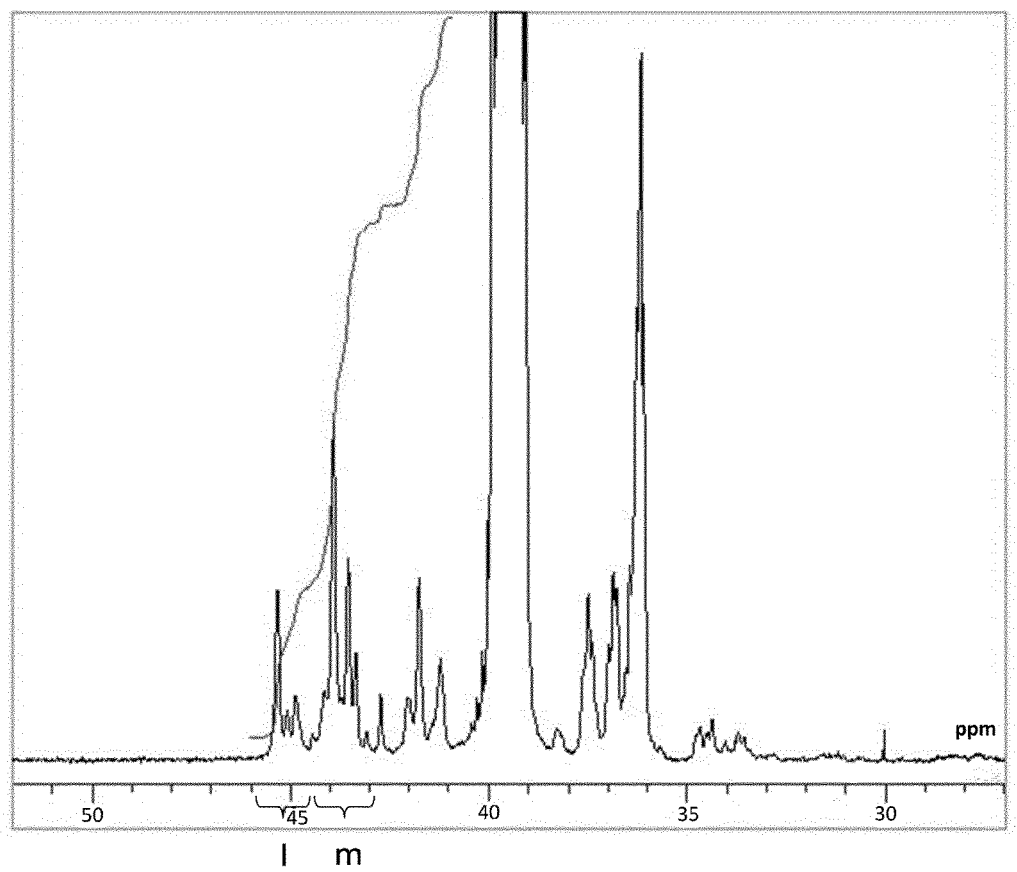

The $^{13}$C-NMR measurements were carried out using a spectrometer of AV 600 type from Bruker. 12% by weight solutions of PVB were produced in deuterated dimethyl sulphoxide (DMSO) in NMR tubes with a diameter of 10 mm. Chromium(III) acetylacetonate was added in an amount of 0.9% by weight as a relaxation agent. The NMR measurement was carried out in the gated decoupled mode at 80° C. The signals were allocated in accordance with FIGS. 1 to 4. The horizontal axis in the figures represents the chemical shift in ppm (resonance frequency DMSO-d6: 39.5 ppm). The vertical axis represents resonance intensity.

The integration limits of the resonance peak are shown in FIGS. 1 to 4 and are shown in table 1. Integration between chemical shifts is given in [ppm].

In table 1, the following abbreviations are used:
* m form: meso form, r form: racemo form, mm form: meso/meso form, mr form: meso/racemo form, rr form: racemo/racemo form, rrrr form: racemo/racemo/racemo/racemo form, mrrr form: meso/racemo/racemo/racemo form, mrrm from: meso/racemo/racemo/meso form The expressions shown in table 2 are used as a relative measure for the proportions of different structural units.

TABLE 1

|   |   | Range |
|---|---|---|
| a | Carbonyl C-atom of the acetyl group | 168.5-170.5 |
| b | Methine C-atom of acetal part of the 5-membered butyral ring | 101.6-102.4 |
| c | Methine C-atom of acetal part of the 6-membered butyral ring having m form | 98.5-101.6 |
| d | Methine C-atom of acetal part of the 6-membered butyral ring having r form | 91.5-94.5 |
| e | Methine C-atom of the main chain of the 6-membered butyral ring having m form | 70.9-74.5 |
| f | Methine C-atom of the main chain of the 6-membered butyral ring having r form and methine C-atom of the main chain of 3 continuous isotactic vinyl alcohol group (having mm form by triad) | 66.4-70.0 |
| g | Methine C-atom of the main chin of 3 continuous atactic vinyl alcohol group (having mr form by triad) | 65.8-66.4 |
| h | Methine C-atom of the main chain of vinyl alcohol between the 6-membered butyral ring and vinyl alcohol of m form | 64.8-65.8 |
| i | Methine C-atom of the main chain of 3 continuous syndiotactic vinyl alcohol group (having rr form by triad) | 63.9-64.8 |
| i-a | Methine C-atom of the main chain of syndiotactic vinyl alcohol group having rrrr form by pentad | 64.21-64.7 |
| i-b | Methine C-atom of the main chain of syndiotactic vinyl alcohol having mrrr form by pentad | 64.08-64.21 |
| i-c | Methine C-atom of the main chain of syndiotactic vinyl alcohol having mrrm form by pentad | 63.9-64.08 |
| j | Methine C-atom of the main chain of vinyl alcohol between the 6-membered butyral ring and vinyl alcohol of r form | 63.0-63.9 |
| k | Methine C-atom of the main chain of vinyl alcohol between the 6-membered butyral rings | 61.6-63.0 |
| l | Methylene C-atom of a VV-sequence | 44.6-46 |
| m | Methylene C-atom of VB and BB sequence | 42.9-44.6 |

TABLE 2

| | Calculation method |
|---|---|
| | Molar ratio of syndiotactic sequence of vinyl alcohol group with 3 members based on whole of vinyl alcohol groups |
| f | Methine C-atom of the main chain of 3  f − e (c/d) continuous isotactic vinyl alcohol group (having mm form by triad) |

TABLE 2-continued

| | Calculation method | |
|---|---|---|
| | (VmVVm)/(all V) | i/(f + g + h + i + j + k) |
| | Content of syndiotactic sequence of vinyl alcohol group with 3 members based on whole of groups consisting vinyl alcohol group, vinyl acetal group and vinyl acetate group | |
| A | Integral value of whole of methine C-atom of the main chain | Integral value from 60 ppm to 82 ppm |
| | (VmVVm)/(all groups) (mol %) | i/A × 100 |
| | HO blockiness | |
| | VV/(VB + BB) | l/m |

\* VmVVm: 3 continuous syndiotactic vinyl alcohol, V: vinyl alcohol

In the calculation of Molar ratio of syndiotactic sequence of vinyl alcohol group with 3 members based on whole of vinyl alcohol groups, the base line based on from 60 ppm to 82 ppm is used for calculation of each integral value for signal e to signal k. And in the calculation of HO blockiness, the base line based on from 41 ppm to 46 ppm is used for calculation of each integral value for signal l and signal m.

EXAMPLES

3G8=Triethyleneglycol-bis-2-ethylhexanoate
3G6=Triethyleneglycol-bis-n-hexanoate
DBEA=Bis(2-butoxyethyl)adipate
DBEEA=Bis(2-butoxyethoxyethyl)adipate
DINCH=1,2-Cyclohexane dicarboxylic acid diisononylester
BHT=3,5-Bis(1,1dimethylethyl)-4-hydroxy toluene
PVB=polyvinyl butyral with the given PVA content
CE: Comparative example
E: example according to the invention Comparative Example 1

100 parts by weight of the polyvinyl alcohol Mowiol 28-99 (commercial product from Kuraray Europe GmbH) with an Acetyl-content of 0.71 wt % were dissolved in 1075 parts by weight of water with heating to 90° C. A solution of 0.156 parts by weight of the oxidation stabilizer BHT in 57.5 parts by weight of n-butyraldehyde was added at a temperature of 40° C. and 82.5 parts by weight of 20% hydrochloric acid were added with stirring at a temperature of 12° C. within 6 min, after which the polyvinyl butyral (PVB) precipitated. The mixture was then held at 12° C. for a further 15 min with stirring, then heated to 73° C. within 80 min and was held at this temperature for 60 min. The PVB was separated after cooling to ambient temperature, washed neutral with water and dried to a solid content of >99%. A PVB with a polyvinyl alcohol content of 20.0% by weight and a polyvinyl acetate content of 1.030% by weight was obtained.

362.5 g of PVB, 125 g of the plasticizer 3G8, 12.5 g of the plasticizer DBEA, 0.75 g of the UV stabilizer Tinuvin 328, 0.24 g of a 25% aqueous solution of potassium acetate and 0.1 g of a 25% aqueous solution of magnesium acetate tetrahydrate were mixed in a laboratory mixer (manufacturer: Brabender, model 826801) at 20° C. for 5 min. The mixture obtained was extruded to form a flat film with a thickness of 0.8 mm. Extrusion was carried out using a double-screw extruder with screws rotating in opposite directions (manufacturer: Haake, system Rhecord 90), equipped with a melting pump and a sheet die. The cylinder temperature of the extruder was 220° C., the nozzle temperature was 150° C.

Comparative Example 2

Synthesis was according to comparative example 1 except that the holding time at 73° C. was 120 min. A PVB with a polyvinyl alcohol content of 20.0% by weight and a polyvinyl acetate content of 0.94% by weight was obtained. Mixing and extrusion was done according to comparative example 1.

Comparative Example 3

Synthesis was done according to comparative example 2, yielding a PVB with a polyvinyl alcohol content of 19.8% by weight. 350 g of PVB and 140 g of the plasticizer 3G6 were mixed and extruded according to comparative example 1.

Comparative Example 4

200 g of PVB according to comparative example 2, 120 g of the plasticizer DBEEA, 0.48 g of the UV stabilizer Tinuvin 328, 0.154 g of a 25% aqueous solution of potassium acetate and 0.064 g of a 25% aqueous solution of magnesium acetate tetrahydrate were mixed and extruded according to comparative example 1.

Example 1

100 parts by weight of the polyvinyl alcohol according to comparative example 1 were dissolved in 1075 parts by weight of water with heating to 90° C. A solution of 0.156 parts by weight of the oxidation stabilizer BHT in 57.2 parts by weight of n-butyraldehyde was added at a temperature of 40° C. and 165 parts by weight of 20% hydrochloric acid were added with stirring at a temperature of 12° C. within 6 min, after which the polyvinyl butyral (PVB) precipitated. The mixture was then held at 12° C. for a further 15 min with stirring, then heated to 73° C. within 80 min and was held at this temperature for 240 min. Further work-up was according to comparative example 1. A PVB with a polyvinyl alcohol content of 20.2% by weight was obtained. A film was prepared according to comparative example 1.

Example 2

Proceeding was according to example 1 except that the mixture was heated to 78° C. after precipitation of PVB. A PVB with a polyvinyl alcohol content of 20.2% by weight was obtained.

Example 3

Proceeding was according to example 1 except that the aqueous solution of poly vinyl alcohol was saponified to an acetyl content of 0.32 wt % at 90° C. by addition of 0.63 parts per weight of sodium hydroxide. A PVB with a polyvinyl alcohol content of 20.1% by weight was obtained.

Example 4

Proceeding was according to example 3 except that the mixture was heated to 78° C. after precipitation of PVB. A PVB with a polyvinyl alcohol content of 20.1% by weight was obtained.

Table 3 shows the data of comparative examples 1 and 2 and of examples 1-4, which illustrate the reduced flowability at varying degrees of acetalization.

TABLE 3

|  | CE 1 | CE 2 | E1 | E2 | E3 | E4 |
|---|---|---|---|---|---|---|
| PVB properties |  |  |  |  |  |  |
| Acid ratio [mol H+/kg PVOH] | 4.53 | 4.53 | 9.05 | 9.05 | 9.05 | 9.05 |
| Final temperature [° C.] | 73 | 73 | 73 | 78 | 73 | 78 |
| Holding time at final temperature [min] | 60 | 120 | 240 | 240 | 240 | 240 |
| Polyvinyl alcohol content PVB [w %] | 20.00 | 20.00 | 20.20 | 20.18 | 20.10 | 20.06 |
| Polyvinyl acetate content PVB [w %] | 1.03 | −.94 | 1.2 | 1.22 | 0.84 | 0.72 |
| Polyvinyl acetate content PVB [mol %] | 0.76 | 0.69 | 0.88 | 0.9 | 0.62 | 0.53 |
| Degree of acetalisation [w %] | 78.97 | 79.06 | 78.60 | 78.60 | 79.06 | 79.22 |
| Degree of acetalisation [mol %] | 70.45 | 70.52 | 70.06 | 70.07 | 70.47 | 70.62 |
| Molar ratio of 3 continuous syndiotactic vinyl alcohol based on whole of vinyl alcohol groups | 0.146 | 0.150 | 0.187 | 0.198 | 0.188 | 0.199 |
| 3 continous syndiotactic vinyl alcohol groups based on whole of groups (13 C-NMR) [mol %] | 4.03 | 4.22 | 5.38 | 5.64 | 5.34 | 5.61 |
| Molar ratio of mrrm vinyl alcohol sequences | 0.393 | 0.412 | 0.288 | 0.296 | 0.291 | 0.282 |
| Molar ratio of mrrr vinyl alcohol sequences | 0.397 | 0.387 | 0.408 | 0.388 | 0.405 | 0.408 |
| Molar ratio of rrrr vinyl alcohol sequences | 0.210 | 0.201 | 0.304 | 0.315 | 0.304 | 0.310 |
| OH blockiness VV/(BV + BB) (13C-NMR) | 0.302 | 0.320 | 0.419 | 0.424 | 0.400 | 0.427 |
| Viscosity PVB, 5% sol. in ethanol [mPas] | 83.7 | 85.2 | 100.5 | 114.5 | 138.4 | 126.5 |
| Film properties |  |  |  |  |  |  |
| Plasticizer type | 3G8/DBEA (10:1) | 3G8/DBEA (10:1) | 3G8/DBEA (10:1) | 3G8/DBEA (10:1) | 3G8/DBEA (10:1) | 3G8/DBEA (10:1) |
| plasticizer content [w %] | 27.5 | 27.5 | 27.5 | 27.5 | 27.5 | 27.5 |
| MFR 100/2 mm/21.6 kg [mg/10 min] | 229 | 182 | 3 | 3 | 6 | 0 |
| MFR 120/2 mm/21.6 kg [g/10 min] | 1.83 | 1.44 | 0.043 | 0.023 | 0.033 | 0.014 |
| MFR 140/2 mm/21.6 kg [g/10 min] | 8.35 | 6.99 | 1.15 | 0.71 | 0.8 | 0.3 |

Example 5

Synthesis was done according to example 1, yielding a PVB with a polyvinyl alcohol content of 19.6% by weight. Mixing with plasticizer and extrusion was done according to comparative example 3.

Example 6

Synthesis was done according to example 2, yielding a PVB with a polyvinyl alcohol content of 19.8% by weight. Mixing with plasticizer and extrusion was done according to comparative example 3.

Example 7

Synthesis was done according to example 3, yielding a PVB with a polyvinyl alcohol content of 20.1% by weight. Mixing with plasticizer and extrusion was done according to comparative example 3.

Example 8

Synthesis was done according to example 4, yielding a PVB with a polyvinyl alcohol content of 20.4% by weight. Mixing with plasticizer and extrusion was done according to comparative example 3.

Table 4 shows the data of comparative example 2 and examples 5-8, which illustrate the reduction of flowability at 120 and 150° C. according to this invention. This is in contrast to the disclosure of JP3036894, where an enhancement of flowability is described.

Examples 9-12

PVBs from examples 1 and 3 were processed to film according to comparative example 4.

Table 5 shows the effect of reduced flowability at high plasticizer content (CE 4 and E 9-10).

Comparative Example 5

100 parts by weight of the polyvinyl alcohol Mowiol 28-99 (commercial product from Kuraray Europe GmbH) with an Acetyl-content of 0.71 w % were dissolved in 1075 parts by weight of water with heating to 90° C. A solution of 0.156 parts by weight of the oxidation stabilizer BHT in 67.5 parts by weight of n-butyraldehyde was added at a temperature of 40° C. and 110 parts by weight of 20% hydrochloric acid were added with stirring at a temperature of 12° C. within 6 min, after which the polyvinyl butyral (PVB) precipitated. The mixture was then held at 12° C. for a further 15 min with stirring, then heated to 69° C. within 80 min and was held at this temperature for 120 min. The PVB was separated after cooling to ambient temperature, washed neutral with water and dried to a solid content of >99%. A PVB with a polyvinyl alcohol content of 14.5% by weight and a polyvinyl acetate content of 1.24% by weight was obtained.

370 g of PVB, 125 g of the plasticizer DINCH, 0.75 g of the UV stabilizer Tinuvin 328, 0.25 g of the oxidation stabilizer Songnox 2450, 0.25 g of a 25% aqueous solution of magnesium acetate tetrahydrate were mixed in a laboratory mixer (manufacturer: Brabender, model 826801) at 20° C. for 5 min. The mixture obtained was extruded to form a flat film with a thickness of 0.8 mm. Extrusion was carried out using a double-screw extruder with screws rotating in opposite directions (manufacturer: Haake, system Rhecord 90), equipped with a melting pump and a sheet die. The cylinder temperature of the extruder was 220° C., the nozzle temperature was 150° C.

Example 11

100 parts by weight of the polyvinyl alcohol according to comparative example 1 were dissolved in 1075 parts by weight of water with heating to 90° C. The aqueous solution of poly vinyl alcohol was saponified to an acetyl content of 0.32 w % at 90° C. by addition of 0.63 parts per weight of sodium hydroxide. A solution of 0.156 parts by weight of the oxidation stabilizer BHT in 61.5 parts by weight of n-butyraldehyde was added at a temperature of 40° C. and 189 parts by weight of 30% nitric acid were added with stirring at a temperature of 12° C. within 10 min, after which the polyvinyl butyral (PVB) precipitated. The mixture was then held at 12° C. for a further 15 min with stirring, then heated to 73° C. within 80 min and was held at this temperature for 240 min. Further work-up was according to comparative example 4. A PVB with a polyvinyl alcohol content of 15.8% by weight and a polyvinyl acetate content of 0.82% by weight was obtained. A film was prepared according to comparative example 5.

Table 6 shows the data of comparative example 5 and example 11, which illustrate the reduction of flowability at high degree of acetalization.

TABLE 4

|  | CE 3 | E 5 | E 6 | E 7 | E 8 |
|---|---|---|---|---|---|
| PVB properties |  |  |  |  |  |
| Acid ratio [mol H+/kg PVOH] | 4.53 | 9.05 | 9.05 | 9.05 | 9.05 |
| Final temperature [° C.] | 73 | 73 | 78 | 73 | 78 |
| Holding time at final temperature [min] | 120 | 240 | 240 | 240 | 240 |
| Polyvinyl alcohol content PVB [w %] | 19.84 | 19.62 | 19.79 | 20.1 | 20.44 |
| Polyvinyl acetate content PVB [w %] | 1.5 | 1.5 | 1.26 | 0.37 | 0.4 |
| Polyvinyl acetate content PVB [mol %] | 1.11 | 1.11 | 0.93 | 0.27 | 0.29 |
| Degree of acetalisation [w %] | 78.66 | 78.88 | 78.95 | 79.53 | 79.16 |
| Degree of acetalisation [mol %] | 70.29 | 70.57 | 70.54 | 70.84 | 70.38 |
| Film properties |  |  |  |  |  |
| Plasticizer type | 3G6 | 3G6 | 3G6 | 3G6 | 3G6 |
| plasticizer content [parts per hundred parts resin] | 40 | 40 | 40 | 40 | 40 |
| Melt viscosity 120° C./20 kg/1 mm [Poise] | 1355000 | n.m.* | n.m.* | n.m.* | n.m.* |
| Melt viscosity 150° C./20 kg/1 mm [Poise] | 61940 | 205200 | 367900 | 604400 | 1441000 |

*n.m. = not measurable (material did not flow)

TABLE 5

|  | CE 4 | E 9 | E 10 |
|---|---|---|---|
| PVB properties |  |  |  |
| Acid ratio [mol. H+/kg PVOH] | 4.53 | 9.05 | 9.05 |
| Final temperature [° C.] | 73 | 73 | 73 |
| Holding time at final temperature [min] | 120 | 240 | 240 |
| Polyvinyl alcohol content PVB [w %] | 20.49 | 20.20 | 20.1 |
| Polyvinyl acetate content PVB [w %] | 1.39 | 1.2 | 0.84 |
| Polyvinyl acetate content PVB [mol %] | 1.02 | 0.88 | 0.62 |
| Degree of acetalisation [w %] | 78.12 | 78.6 | 79.07 |
| Degree of acetalisation [mol %] | 69.54 | 70.6 | 70.47 |
| Film properties |  |  |  |
| Plasticizer type | DBEEA | DBEEA | DBEEA |
| plasticiser content [w %] | 37.5 | 37.5 | 37.5 |
| MFR 100/2 mm/21.6 kg [mg/10 min] | 1457 | 31 | 26 |
| MFR 120/2 mm/21.6 kg [g/10 min] | 10.35 | 0.631 | 0.547 |
| MFR 140/2 mm/21.6 kg [g/10 min] | 58.4 | 8.595 | 7.806 |

TABLE 6

|  | CE 5 | E 11 |
|---|---|---|
| PVB properties |  |  |
| Acid ratio [mol H+/kg PVOH] | 60.3 | 9.05 |
| Final temperature [° C.] | 69 | 73 |
| Holding time at final temperature [min] | 120 | 240 |
| Polyvinyl alcohol content PVB [w %] | 14.50 | 15.82 |
| Polyvinyl acetate content PVB [w %] | 1.24 | 0.82 |
| Polyvinyl acetate content PVB [mol %] | 0.94 | 0.62 |
| Degree of acetalisation [w %] | 84.26 | 83.36 |
| Degree of acetalisation [mol %] | 77.53 | 76.08 |
| Molar ratio of 3 continuous syndiotactic vinyl alcohol based on whole of vinyl alcohol groups | 0.081 | 0.154 |
| 3 continous syndiotactic vinyl alcohol groups based on whole of groups (13 C-NMR) [mol %] | 1.61 | 3.55 |
| Molar ratio of mrrm vinyl alcohol sequences (13 C-NMR) | 0.574 | 0.360 |
| Molar ratio of mrrr vinyl alcohol sequences (13 C-NMR) | 0.255 | 0.387 |
| Molar ratio of rrrr vinyl alcohol sequences (13 C-NMR) | 0.171 | 0.253 |
| OH blockiness VV/(BV + BB) (13C-NMR) | 0.130 | 0.285 |
| Viscosity PVB, 5% sol. in ethanol [mPas] | 75.1 | 90.2 |
| Film properties |  |  |
| Plasticizer type | DINCH | DINCH |
| plasticizer content [w %] | 26 | 26 |
| MFR 100/2 mm/21.6 kg [mg/10 min] | 386 | 45 |
| MFR 120/2 mm/21.6 kg [g/10 min] | 1.936 | 0.448 |
| MFR 140/2 mm/21.6 kg [g/10 min] | 6.858 | 3.77 |

The invention claimed is:

1. Polyvinyl acetal with a degree of acetalization of 70-84 mol %, having a molar ratio of the amount of continuous syndiotactic sequences of vinyl alcohol groups with 3 members of at least 0.152, based on the total amount of vinyl alcohol groups in the polyvinyl acetal.

2. The polyvinyl acetal of claim 1, wherein continuous syndiotactic sequences of vinyl alcohol groups with 3 members are present in an amount of at least 4.5 mol%, based on the sum of the amounts of vinyl alcohol groups, vinyl acetal groups and vinyl acetate groups in the polyvinyl acetal.

3. The polyvinyl acetal of claim 1, having a molar ratio of the amount of continuous sequences of vinyl alcohol groups with 5 members with a stereochemical sequence of mrrm of less than 0.3 based on the total amount of continuous syndiotactic sequences of vinyl alcohol groups with 3 members in the polyvinyl acetal.

4. The polyvinyl acetal of claim 2, having a molar ratio of the amount of continuous sequences of vinyl alcohol groups with 5 members with a stereochemical sequence of mrrm of less than 0.3 based on the total amount of continuous syndiotactic sequences of vinyl alcohol groups with 3 members in the polyvinyl acetal.

5. The polyvinyl acetal of claim 1, having a molar ratio of the amount of continuous sequences of vinyl alcohol groups with 5 members with a stereochemical sequence of rrrr of more than 0.23 based on the total amount of continuous syndiotactic sequences of vinyl alcohol groups with 3 members in the polyvinyl acetal.

6. The polyvinyl acetal of claim 1, having an OH blockiness of the polyvinyl acetal, defined as a quotient VV(VB+BB) of more than 0.35, wherein VV is the amount of methylene groups of two adjacent alcohol sequences, VB is the amount of methylene groups adjacent to an alcohol and an acetal sequence and BB is the amount of methylene groups of two adjacent acetal sequences.

7. The polyvinyl acetal of claim 1, having a solution viscosity in a 5% by weight solution in ethanol of more than 90 mPas.

8. The polyvinyl acetal of claim 1, wherein the process of producing the polyvinyl acetal is carried out in the absence of emulsifiers or surfactants.

9. The polyvinyl acetal of claim 1, having a residual acetate content of 0.1 to 8 mol %.

10. The polyvinyl acetal of claim 1, having a polymerisation degree of less than 2500.

11. A process for preparing a polyvinyl acetal of claim 1, by acid-catalysed reaction of at least one polyvinyl alcohol with at least one aldehyde, comprising the following process steps:
  a) acetalizing by reacting the polyvinyl alcohol with the aldehyde at a temperature of 0 to 30° C. by addition of an acid catalyst, whereas the ratio of acid catalyst to the polyvinyl alcohol to be acetalized is at least 7.5 mol H+ per kg of the polyvinyl alcohol,
  b) completing the acetalizing by heating the reaction mixture of a) after complete dosage of the acid catalyst, to 69° C. to 80° C. and maintaining within this temperature range for at least 180 min,
  c) cooling the reaction mixture of b) to 15 to 45° C. and separating the polyvinyl acetal, and
  d) neutralising the polyvinyl acetal separated from the reaction mixture.

12. The process of claim 11, wherein the polyvinyl acetal precipitates during step a) and at least 5% of the acid catalyst is added before the beginning of the precipitation of the polyvinyl acetal.

13. The process of claim 11, wherein the temperature in process step a) is maintained over a period of at least 20 min.

14. The process of claim 11, wherein the temperature in process step b) is maintained over a period of at least 210 min.

15. The process of claim 11, which is conducted in the absence of emulsifiers or surfactants.

16. A Film comprising 0-42 weight % plasticizer and 100-58 weight % of at least one polyvinyl acetal of claim 1.

17. A Film comprising 0-42 weight % plasticizer and 100-58 weight % of at least one polyvinyl acetal produced by the process of claim 11.

* * * * *